United States Patent [19]
Gannon et al.

[11] Patent Number: 6,020,830
[45] Date of Patent: Feb. 1, 2000

[54] TELEMETRY SYSTEM USING BROADBAND CORRELATION TECHNIQUES

[75] Inventors: James M. Gannon, North Kingstown; Robert M. Payton, Portsmouth, both of R.I.

[73] Assignee: The United States of America as represented by the Secretary of the Navy, Washington, D.C.

[21] Appl. No.: 08/953,789

[22] Filed: Oct. 14, 1997

[51] Int. Cl.[7] ....................................... H04J 4/00
[52] U.S. Cl. ................... 340/870.13; 340/870.11; 370/307; 370/479
[58] Field of Search .......................... 340/870.11, 870.13, 340/870.14; 370/307, 479, 537; 455/227

[56] References Cited

U.S. PATENT DOCUMENTS

| | | | |
|---|---|---|---|
| 4,638,480 | 1/1987 | Darton | 340/870.11 |
| 5,211,063 | 5/1993 | Hobmaier | 340/870.11 |
| 5,272,476 | 12/1993 | McArthur | 340/870.13 |
| 5,307,372 | 4/1994 | Sawyer | 340/870.11 |
| 5,406,553 | 4/1995 | Smith | 370/307 |
| 5,483,230 | 1/1996 | Mueller | 340/870.11 |
| 5,608,724 | 3/1997 | Green | 370/307 |

*Primary Examiner*—Michael Horabik
*Assistant Examiner*—Albert K. Wong
*Attorney, Agent, or Firm*—Michael J. McGowan; Robert W. Gauthier; Prithvi C. Lall

[57] ABSTRACT

An efficient and cost effective analog telemetry system for transmitting and receiving many individual data channels over long distances is provided by having each data channel signal modulate a pseudo-random number (PRN) signal which has been delayed for a distinct number of clock cycles for each data channel. The modulated PRN signals are then outputted to a single data line and summed. At the remote receiver, each data signal is recovered by cross correlating the modulated PRN signals with individual reference PRN signals. A synchronous delay generator in each data channel properly aligns each reference signal in time with its corresponding modulated PRN signal. Other modulated PRN signals, which are not aligned with the proper reference PRN signal, are rejected.

11 Claims, 3 Drawing Sheets

TELEMETRY SYSTEM USING BROADBAND CORRELATION TECHNIQUES

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to telemetry, and more particularly to telemetry of multiple data channels.

(2) Description of the Prior Art

In many types of tests it is necessary to collect data in one location and transmit that data to another location for processing. For example, a sensor may be placed in a hostile environment and monitored by personnel at a distant, safe location. A channel is established between the sensor and the monitor over which the data is carried. Typically, however, data collection requires the use of multiple sensors and multiple channels. Providing separate carriers for each channel quickly becomes too costly as the number of sensors increases. Various means have been developed to provide separate data channels within a single carrier. Two of the more common telemetry schemes include frequency-division multiplexing (FDM) and time-division multiplexing (TDM). In FDM, each data channel signal is used to modulate a carrier signal having a unique frequency and the carrier signals are multiplexed by summing them together. At the signal monitoring end, receivers responsive to the separate frequencies can retrieve the individual data channel signals from the multiplexed carrier signal. In TDM, each data channel signal is allotted a time slot. To obtain a specific data signal, the receiver selects the time slot for that data signal. Various means can be used in FDM and TDM. U.S. Pat. No. 5,406,553 to Smith et al., recites an apparatus for converting a FDM signal to a TDM signal in which a voltage control oscillator whose output is a staircase of reference frequencies is mixed by a mixer with a received FDM signal. Each received frequency is output in turn at a common intermediate frequency from a bandpass filter, thereby forming a TDM signal after passing through a demodulator and low pass filter. U. S. Pat. No. 5,608,724 to Green, Jr., recites a dynamically reconfigurable FDM and modulator which accepts multiple TDM input signals. Each input signal is used to modulate a carrier signal having a unique frequency. Switches are used to selectively form one or more groups of the modulated signals and the signals in each group are FDM'd. The output for each group is fed to a respective antenna and the switches and carrier signals are controlled to selectively associate input signals, carrier signals and antennas. However, such multiplexing systems become costly and tend to be complex and bulky. In some testing environments, there is limited space for the sensors and receivers and the use of the described prior art systems may not be practical. Also, these prior art systems typically have limited dynamic range, bandwidth channel capacity and sensitivity.

SUMMARY OF THE INVENTION

Accordingly, it is an object of the present invention to provide a telemetry system for low cost telemetry of multiple data channels.

Another object of the present invention is to provide a telemetry system for telemetry of multiple data channels which is small in size.

Still another object of the present invention is to provide a telemetry system having increased dynamic range, bandwidth, channel capacity and sensitivity.

Other objects and advantages of the present invention will become more obvious hereinafter in the specification and drawings.

In accordance with the present invention, an analog telemetry system is provided in which each data channel signal modulates a specific time delayed pseudo-random number (PRN) signal. The PRN signals are then outputted to a single data line. At the remote receiver, each data signal is recovered by cross correlating the modulated PRN signals with individual reference PRN signals. Each reference signal is properly aligned in time with its corresponding modulated PRN signal by using a synchronous delay generator in each data channel and non-aligned modulated signals are rejected.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
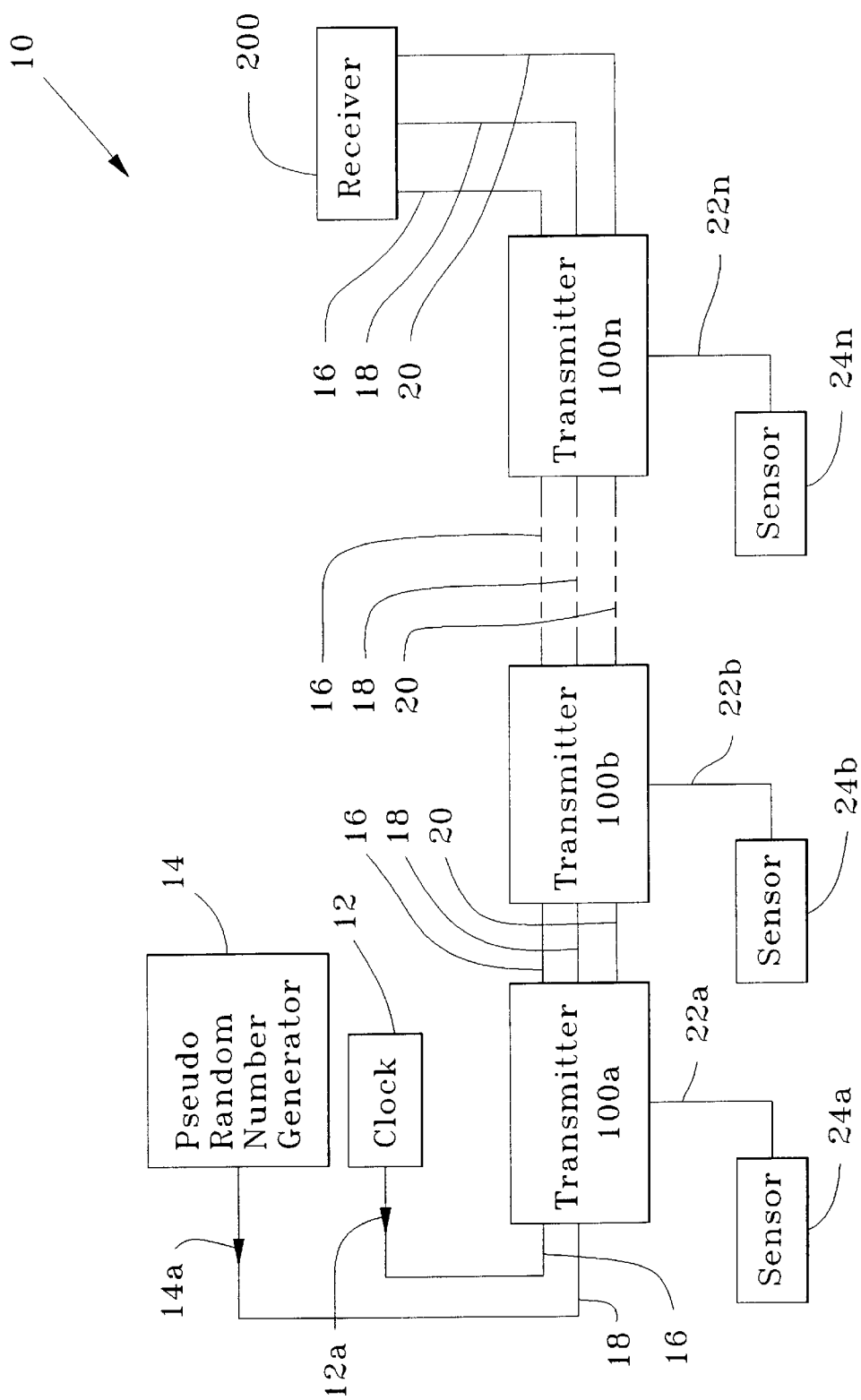
FIG. 1 is a block diagram of the telemetry system of the present invention.

Referring now to FIG. 1, there is shown a block diagram of telemetry system 10 having a clock 12, a PRN generator 14, a series of 'n' transmitters 100a–100n and a receiver 200. The number of transmitters 'n' corresponds to the number of data channels required for sensor input. Three signal lines interconnect transmitters 100: clock 12 provides clock signal 12a on clock line 16 which is electrically connected from clock 12 to each of the transmitters 100a–100n and receiver 200; PRN 14 provides PRN signal 14a on PRN line 18 which is also electrically connected to each of the transmitters 100a–100n and receiver 200; and data channel line 20 is electrically connected from transmitter 100a to each of the transmitters 100b–100n and receiver 200. In addition, data input lines 22a–22n connect transmitters 100a–100n to their respective sensors 24a–24n.

Figure 2:
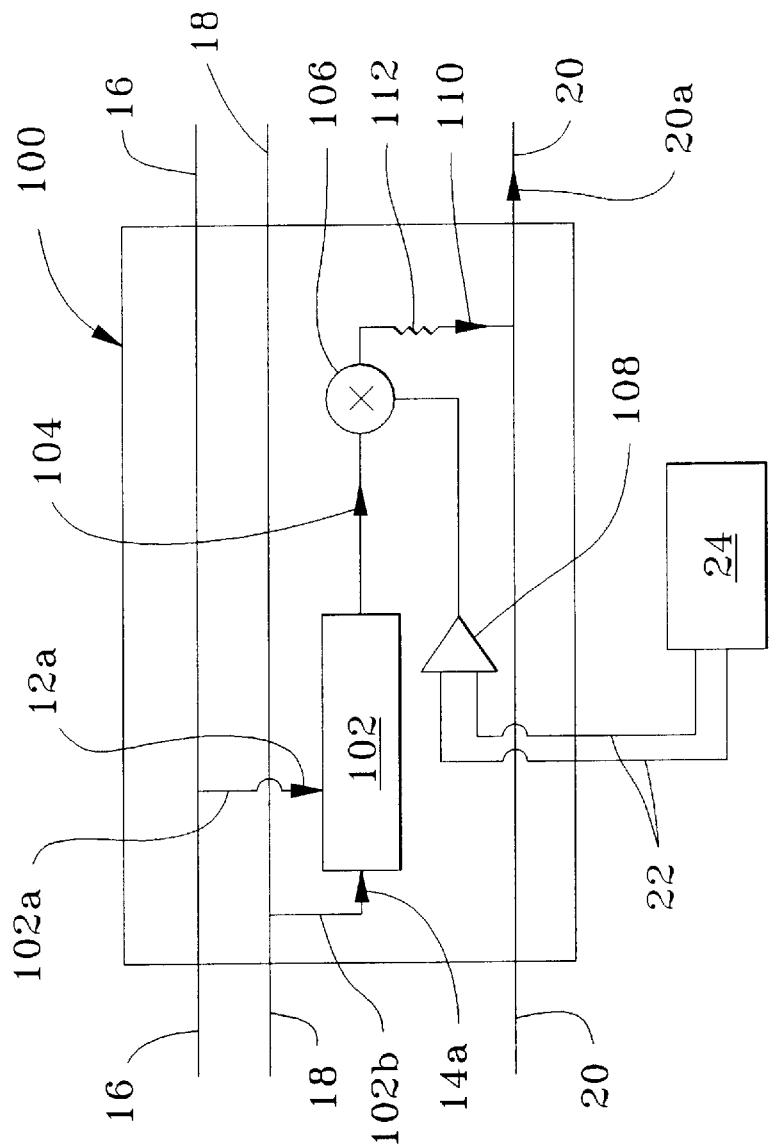
FIG. 2 is a schematic diagram of a transmitter of the telemetry system of the present invention.

Referring now to FIG. 2, a schematic diagram of one of the transmitters 100 is shown. Clock line 16, PRN line 18 and data channel line 20 are connected from a previous transmitter (not shown), through transmitter 100 to the next transmitter (not shown). Transmitter 100 has a delay generator 102 which is connected to and receives clock signal 12a and PRN signal 14a via connections 102a and 102b, respectively. Delay generator 102 outputs a delayed PRN signal 104 which is delayed by exactly one clock cycle with respect to the output of the delay generator in the previous transmitter, regardless of the spacing of the transmitters. Delayed PRN signal 104 is modulated at multiplier 106 by signals from sensor 24 on data input lines 22 via preamplifier 108 which strengthens the signal from sensor 24. The use of multiplier 106 for modulating signals is well known ill the art. Modulated, delayed PRN signal 110 is then coupled into data channel line 20 through resistive voltage divider 112, also well known in the art. Thus data channel line 20 contains data channel line signal 20a which is the sum of all transmitter 100 outputs, each consisting of a PRN signal 14a delayed by a number of clock cycles corresponding to the transmitter 100 position in a series of transmitters and further modulated by signals from the sensor 24 connected to the transmitter 100.

Figure 3:
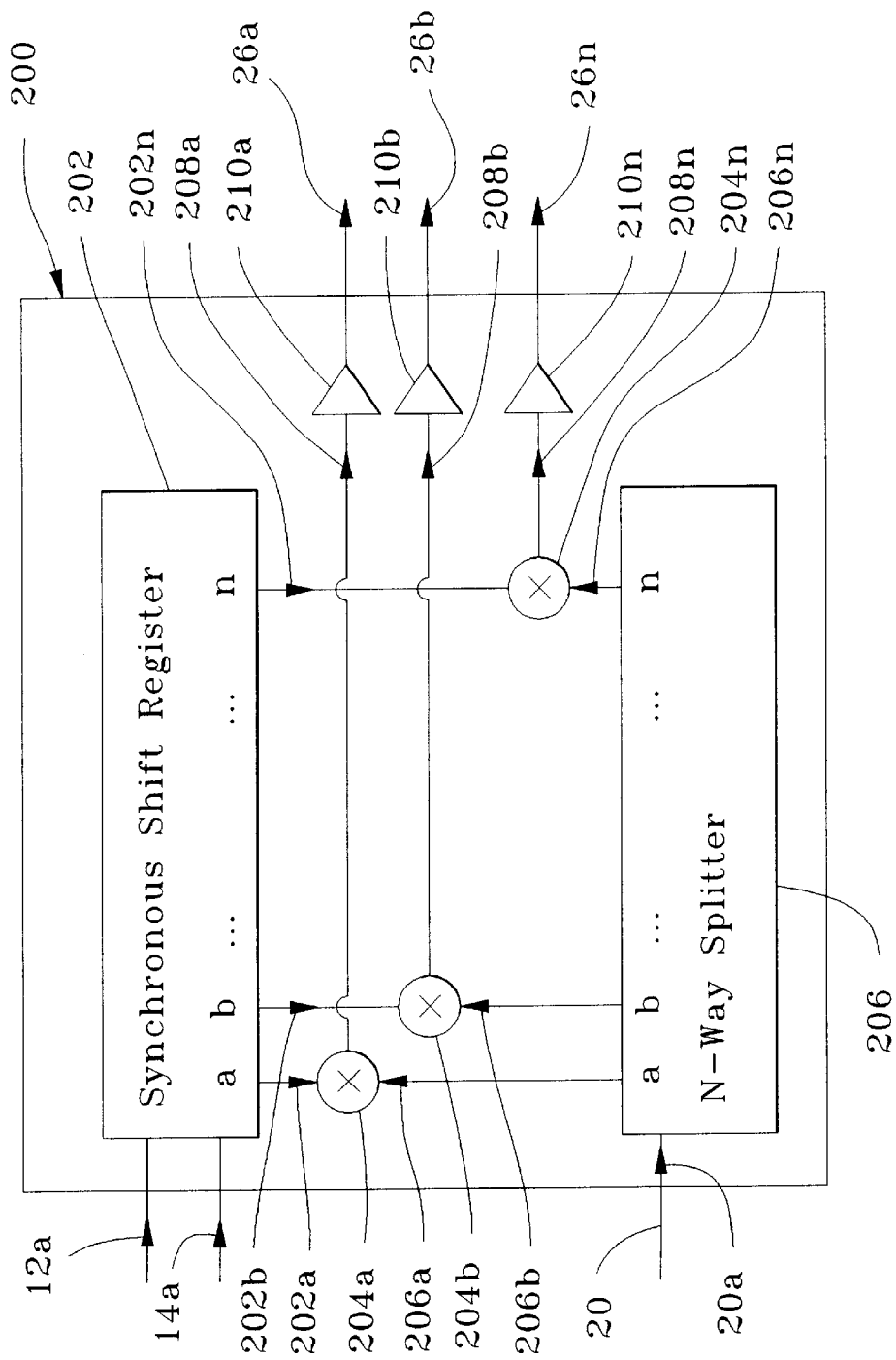
FIG. 3 is a schematic diagram of a receiver of the telemetry system of the present invention.

Referring now additionally to FIG. 3, there is shown a schematic of receiver 200. Receiver 200 is typically remote from transmitters 100. Shift register 202 is a serial in/parallel out: synchronous N-stage shift register well known in the art. Shift register 202 receives clock signal 12a and PRN signal 14a and outputs in parallel, shifted PRN signals 202a–202n, each being shifted one clock cycle from the previous shifted PRN signal. Thus shifted PRN signal 202a is delayed by one clock cycle with respect to PRN signal 14a and is therefor aligned with modulated delayed PRN signal 110a from transmitter 100a. Each shifted PRN signal, 202a–202n, is sent to a corresponding receiver multiplier, 204a–204n. Data channel line 20 is connected to N-way splitter 206 which simply divides data channel signal 20a into divided signals 206a–206n, corresponding to the number of transmitters 100. Divided signals, 206a–206n, are also sent to their corresponding receiver multipliers, 204a–204n. Since the shifted PRN signal 202a–202n and only the modulated delayed PRN signal 110a–110n within divided signal 206a–206n received at their respective receiver multiplier 204a–204n are aligned, only the signal from sensor 24a–24n is output from receiver multiplier 204a–204n, respectively. Receiver multiplier outputs 208a–208n are then passed through intermediate frequency gain blocks 210a–210n to increase signal strength of the final sensor signals 26a–26n.

The invention thus described is a system for telemetering many channels of sensor data from one location to another by having a transmitter for each data channel which modulates a specific time delayed PRN signal with its corresponding sensor signals via a multiplier. Each transmitter output is then coupled into a single data line which carries the sum of all the modulated time delayed PRN signals to a remote receiver. At the receiver, a synchronous shift register provides multiple time delayed PRN signals. The data line signal is divided at the receiver via a N-way divider into a corresponding number of data signals. Each time delayed PRN signal is combined with a divided data signal at a receiver multiplier. Since only one of the modulated time delayed PRN signals within the data line is aligned or correlated with a specific time delayed PRN signal, the output of the receiver multiplier consists of only the corresponding sensor signal. All the data channels are coherently detected and separated from the other data channels by cross-correlating the sum of all the transmitter outputs with individual reference PRN signals which are synchronized in the proper time.

The components of the system, i.e., the clock, PRN generator, delay generator, multipliers, pre-amplifiers, synchronous shift register, splitter and gain blocks, are standard components, well known in the art. The use of these standard components makes the system economical and cost efficient. Further, the dynamic range, bandwidth, channel capacity and sensitivity are not limited as they are in other FDM or TDM telemetry systems. Additionally, the components are compact, allowing the system to be used where space is limited.

Although the present invention has been described relative to a specific embodiment thereof, it is not so limited. For example, the discrete delay generators in each transmitter could be replaced with a synchronous transmitter shift register, similar to the shift register in the receiver. The synchronous transmitter shift register would provide the delayed PRN signal to each transmitter rather than having the delay generator within the transmitter provide the delayed PRN signal. This embodiment somewhat simplifies the transmitter circuit, but may not be as easily modularized as the embodiment of FIGS. 1–3. Another alternative embodiment wherein a pilot tone is injected into one of the transmitter channels to synchronize the reference PRN signals to their corresponding modulated PRN signals can be used to reduce the number of signal lines between the transmitters and the receiver. The N-way splitter of the preferred embodiment may also be replaced with a series of high speed video buffer amplifiers to couple the transmitter outputs from the data line to a specific receiver multiplier. The multipliers can be either double balanced mixer or active mixer type. For small diameter sensor array applications, active mixers are necessary. Along with other components of the system, the multipliers could be integrated onto a silicon chip to further reduce the size of the system. It will be understood that the telemetry system of the present invention can telemeter data from any type of sensor, such as accelerometers, strain gauges, hydrophones, etc., that produces an electrical signal containing the sensor information to be telemetered.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A telemetry system for transmitting a plurality of sensor signals comprising:
   a pseudo random number generator generating a PRN signal;
   a clock generating a clock signal;
   a plurality of transmitters corresponding to the plurality of sensor signals, each one of the plurality of transmitters receiving the PRN signal, the clock signal and the sensor signal corresponding to the transmitter, the transmitter modulating the PRN signal with the sensor signal at a distinct cycle of the clock signal, the transmitter outputting the modulated PRN signal;
   a data channel receiving the modulated PRN signal outputs from each one of the transmitters and summing the modulated PRN signal outputs; and
   a receiver receiving the PRN signal, the clock signal and the summed modulated PRN signals, the receiver splitting the summed modulated PRN signals into a plurality of split modulated PRN signals corresponding to the plurality of sensor signals, combining each one of the plurality of split modulated PRN signals with a PRN signal shifted to the distinct clock cycle corresponding to one of the plurality of sensor signals and demodulating the combined signals to output the plurality of sensor signals.

2. The telemetry system of claim 1 wherein each one of the plurality of transmitters further comprises a delay generator receiving the PRN signal and the clock signal and outputting the PRN signal at a distinct clock cycle.

3. The telemetry system of claim 1 wherein each one of the plurality of transmitters further comprises a preamplifier receiving and strengthening the sensor signal.

4. The telemetry system of claim 1 wherein each one of the plurality of transmitters further comprises a multiplier combining the sensor signal and the PRN signal at the distinct clock cycle and outputting the modulated PRN signal to the data channel.

5. The telemetry system of claim 4 wherein each one of the plurality of transmitters further comprises a resistive voltage divider connected between the multiplier and the data channel and coupling the modulated PRN signal into the data channel.

6. The telemetry system of claim 1 wherein the receiver further comprises a synchronous shift register receiving the clock signal and the PRN signal and outputting a plurality of shifted PRN signals corresponding to the distinct clock cycles of each one of the plurality of transmitters.

7. The telemetry system of claim 1 wherein the receiver further comprises a splitter receiving the summed modulated PRN signals from the data channel and outputting the split modulated PRN signals.

8. The telemetry system of claim 6 wherein the receiver further comprises a plurality of receiver multipliers, each one of the plurality of receiver multipliers receiving one of the shifted PRN signals and one of the split modulated PRN signals and outputting one of the sensor signals.

9. The telemetry system of claim 8 wherein the receiver further comprises a plurality of frequency gain blocks corresponding to the plurality of receiver multipliers, each one of the plurality of gain blocks receiving and strengthening the sensor signal from the corresponding receiver multiplier.

10. A telemetry system for transmitting a plurality of sensor signals comprising:
   a pseudo random number generator generating a PRN signal;
   a clock generating a clock signal;
   a plurality of delay generators, each one of the plurality of delay generators corresponding to one of the plurality of sensor signals, each delay generator receiving the PRN signal and the clock signal and outputting the PRN signal at a distinct clock cycle;
   a plurality of preamplifiers, each one of the plurality of preamplifiers corresponding to one of the plurality of sensor signals, each preamplifier receiving and strengthening the corresponding sensor signal;
   a plurality of multipliers, each one of the plurality of multipliers corresponding to one of the plurality of sensor signals, each multiplier combining the strengthened sensor signal and the PRN signal at the distinct clock cycle and outputting a modulated PRN signal;
   a data channel receiving the modulated PRN signal outputs from each one of the multipliers and summing the modulated PRN signal outputs;
   a splitter receiving the summed modulated PRN signals and splitting the summed modulated PRN signals into a plurality of split modulated PRN signals corresponding to the plurality of sensor signals;
   a synchronous shift register receiving the clock signal and the PRN signal and outputting a plurality of shifted PRN signals corresponding to the distinct clock cycles of each one of the plurality of modulated PRN signals; and
   a plurality of receiver multipliers, each one of the plurality of receiver multipliers corresponding to one of the split modulated PRN signals, each one of the plurality of receiver multipliers receiving and demodulating one of the shifted PRN signals and one of the split modulated PRN signals to output the corresponding sensor signal.

11. A method for telemetering a plurality of sensor signals to a receiver, the method comprising:
   obtaining a pseudo random number signal;
   obtaining a clock signal;
   delaying the pseudo random number signal a distinct number of clock cycles of the clock signal for each one of the plurality of sensor signals;
   modulating the delayed pseudo random number signal with the corresponding sensor signal;
   summing the modulated, delayed pseudo random number signals onto a data channel to produce a summed signal;
   transmitting the pseudo random number signal, the clock signal and the summed signal to the receiver;
   splitting the summed signal at the receiver into a plurality of split signals corresponding to the plurality of sensor signals;
   shifting the pseudo random number signal at the receiver and outputting a plurality of shifted pseudo random number signals, each shifted pseudo random number signal corresponding to the delayed pseudo random number signal for the corresponding sensor signal; and
   combining and demodulating each shifted pseudo random number signal and each split signal for each corresponding sensor signal to output the corresponding sensor signal.

* * * * *